(12) United States Patent
Bracha et al.

(10) Patent No.: US 10,419,370 B2
(45) Date of Patent: Sep. 17, 2019

(54) HIERARCHICAL PACKET BUFFER SYSTEM

(71) Applicant: AVAGO TECHNOLOGIES INTERNATIONAL SALES PTE. LIMITED

(72) Inventors: Gabriel Bracha, Tel-Aviv (IL); Dikla Tzafrir, Petach Tikva (IL); Ariel Shchigelski, Ness-Ziona (IL); Gil Greenstein, Kfar-Saba (IL); Golan Schzukin, Herzeliya (IL); Yahav Yechiel Shifman, Hod-Hasharon (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 232 days.

(21) Appl. No.: 14/850,364

(22) Filed: Sep. 10, 2015

(65) Prior Publication Data
US 2017/0005953 A1    Jan. 5, 2017

Related U.S. Application Data

(60) Provisional application No. 62/188,625, filed on Jul. 4, 2015.

(51) Int. Cl.
*H04L 12/861* (2013.01)
*H04L 12/883* (2013.01)
*H04L 12/863* (2013.01)
*H04L 12/935* (2013.01)

(52) U.S. Cl.
CPC ........ *H04L 49/9052* (2013.01); *H04L 47/622* (2013.01); *H04L 49/9084* (2013.01); *H04L 49/3036* (2013.01); *H04L 49/9015* (2013.01)

(58) Field of Classification Search
CPC . H04L 49/30–3045; H04L 49/90–9094; H04L 47/50–70
See application file for complete search history.

(56) References Cited

U.S. PATENT DOCUMENTS

| 2007/0253439 | A1* | 11/2007 | Iny | H04L 47/527 370/413 |
|---|---|---|---|---|
| 2013/0104124 | A1* | 4/2013 | Tsirkin | G06F 9/45558 718/1 |
| 2013/0262718 | A1* | 10/2013 | Vasudevan | H04L 49/90 710/54 |
| 2014/0181241 | A1* | 6/2014 | Manula | H04L 67/1097 709/217 |
| 2014/0233421 | A1* | 8/2014 | Matthews | H04L 43/0888 370/253 |
| 2015/0215226 | A1* | 7/2015 | Peled | H04L 49/40 370/412 |
| 2016/0006677 | A1* | 1/2016 | Lamb | H04L 49/3045 370/412 |
| 2016/0226797 | A1* | 8/2016 | Aravinthan | H04L 49/3027 |
| 2017/0005951 | A1* | 1/2017 | Labonte | H04L 49/3045 |

* cited by examiner

*Primary Examiner* — Marcus Smith
(74) *Attorney, Agent, or Firm* — Xsensus LLP (57) ABSTRACT

A switching device includes a primary memory and an traffic manager. The primary memory buffers packets for temporary storage. The traffic manager monitors consumed resources in the device related to the buffering of packets in the primary memory. The traffic manager migrates packets buffered in the primary memory to a secondary memory when the consumed resources exceed a certain threshold. The traffic manager also controls dequeuing of the packets from the primary memory and the secondary memory.

19 Claims, 9 Drawing Sheets

HIERARCHICAL PACKET BUFFER SYSTEM

PRIORITY CLAIM

This application claims priority to U.S. provisional patent application Ser. No. 62/188,625, filed Jul. 4, 2015, which is entirely incorporated by reference.

TECHNICAL FIELD

This disclosure relates to a network switching system and more specifically to hierarchical packet buffers of a network switching system.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in path resolution, will further enhance performance of data networks.

A switching device may experience temporary or sustained congestion when incoming bandwidth of the switching device is larger than outgoing bandwidth of the switching device. Specifically, a switching device may receive multiple packets from multiple flows in the network, and those packets may be directed toward the same destination port in the network. The incoming bandwidth of the switching device may be larger than the destination port capacity. In this case, the received packets need to be temporarily stored within the switching device until the congestion subsides.

DETAILED DESCRIPTION

The discussion below makes reference to a switching device that can be used in a network. The switching device includes a primary memory, a secondary memory, and a traffic manager. The primary memory has smaller storage capacity than the secondary memory, but has short enqueue and dequeue latencies compared to the secondary memory. The primary memory buffers incoming packets for short-term storage. The traffic manager monitors consumed resources in the device related to the buffering of packets in the primary memory. The traffic manager evacuates packets buffered in the primary memory to the secondary memory when the level of consumed resources exceeds a certain threshold such as primary-to-secondary memory threshold. The traffic manager controls the dequeuing of packets from the primary memory to either the output or the secondary memory, and the dequeuing of packets from the secondary memory to the output.

The techniques and systems described below may facilitate buffering packets in a switching device by employing two different types of memory circuitry, such as static random access memory (SRAM) circuitry and dynamic random access memory (DRAM) circuitry. SRAM is used to receive all incoming packets, and expedites forwarding non-oversubscribed packets with low latency. DRAM can be used to store oversubscribed packets in SRAM. This hierarchical packet buffer system may result in a switching device having the following features: 1. Having large storage capacity; 2. Being able to sustain transient burst of traffic. 3. Allowing low enqueuing and dequeuing latency time for non-congested flows. The hierarchical buffering techniques described below are not limited to SRAM and DRAM. Any two types of storage or memory may be used in a network device: One type of memory may have a relatively small storage capacity and low latency in enqueuing and dequeuing data. The other type of memory may have a relatively large storage capacity and long latency in enqueuing and dequeuing data.

Figure 1:
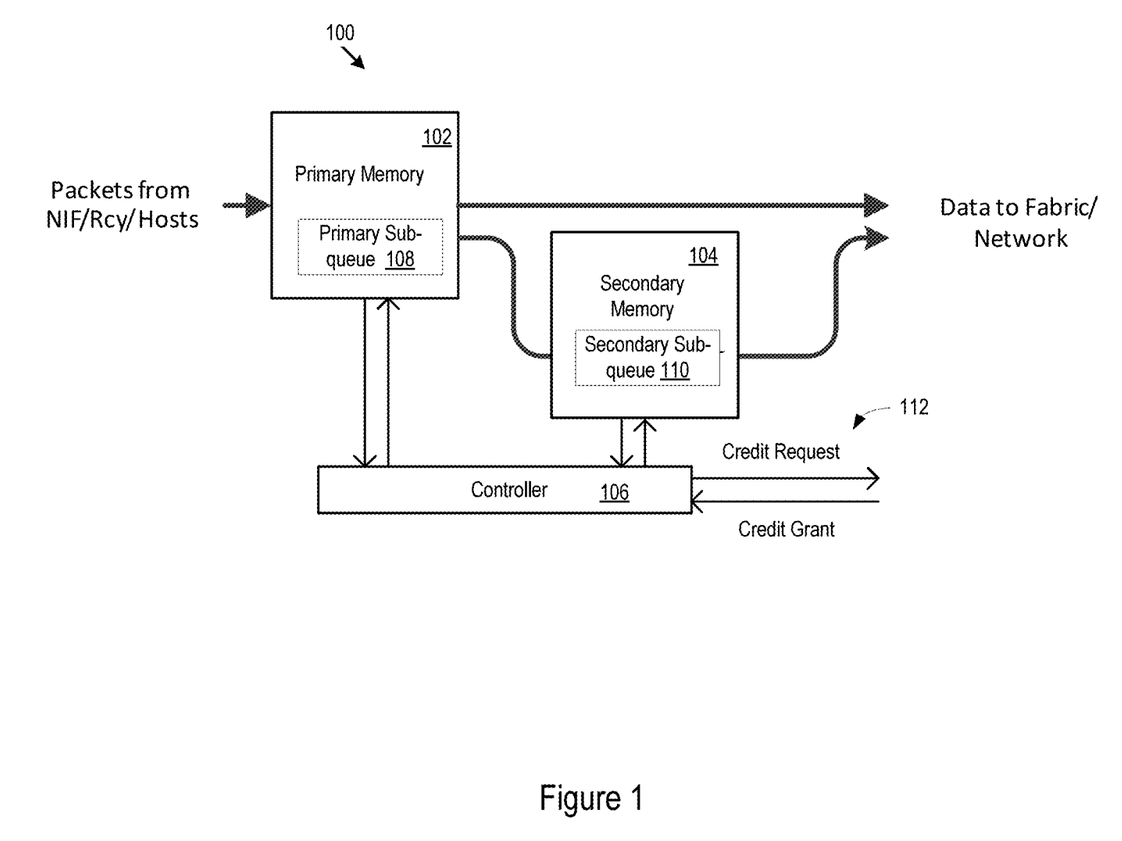
FIG. 1 shows an example of a switch architecture that includes primary memory and secondary memory.

FIG. 1 shows an example of a switch architecture that includes a primary memory 102 and a secondary memory 104. A switching system 100 can receive packets from a packet transmission source, such as a network interface, a receiver or a host/source server. The switching system 100 may buffer the received packets in the primary memory 102. The primary memory 102 can be an on-chip buffer (OCB) primary memory 102, such as an OCB SRAM. The primary memory 102 is referred to as an on-chip buffer (OCB) primary memory in the following discussion, however, the primary memory 102 is not limited to being an on-chip buffer. The OCB primary memory 102 may be used as a primary storage buffer for the switching system 100. The OCB primary memory 102 can be partitioned to multiple buffers of a relatively small size (e.g. between 128 Byte to 512 Byte). Because the size of a single packet can be larger than the size of a single buffer in the OCB primary memory 102, packets may be buffered in the OCB primary memory 102 as a linked list of primary memory buffers. A primary sub-queue 108, which is a part of a virtual output queue (VOQ), may be maintained for the packets buffered in the OCB primary memory 102. The primary sub-queue 108 may consist of a linked list of packets buffered in the OCB primary memory 102. The OCB primary memory 102 in example implementations, can have small storage capacity, for example, up to 10 Megabytes, and can have short enqueuing and dequeuing latencies, when compared to the secondary memory 104.

A controller 106 monitors a traffic congestion level in the OCB primary memory 102, such as by referring to consumed resources of the OCB primary memory 102. When the controller 106 finds that the traffic congestion level in the OCB primary memory 102 exceeds a certain threshold, the controller 106 can instruct the OCB primary memory 102 to migrate packets buffered in the OCB primary memory 102 to the secondary memory 104, such as an off-chip DRAM. In other examples, other forms of memory may be used for the secondary memory 104 such as double data rate fourth generation synchronous dynamic random-access memory (DDR4), double data rate type five synchronous graphics random access memory (GDD5), high bandwidth memory (HBM), and hybrid memory cube (HMC). In addition, the secondary memory 104 may be on chip, off chip, or a combination of on chip and on chip in other examples. The secondary memory 104 is used as a secondary cache to the OCB primary memory 102. A secondary sub-queue 110, which is a part of the VOQ, may be maintained for the packets buffered in the secondary memory 104. The secondary sub-queue 110 is not limited to use with DRAM. The secondary memory 110 may consist of a linked list of packets buffered in the secondary memory 104. The secondary memory 104 can generally have a larger storage capacity, for example, at least several Gigabytes, when compared to the OCB primary memory 102, and can cost less to manufacture compared to the OCB primary memory 102. However, the secondary memory 104 may have longer enqueue and dequeue latencies compared to the OCB primary memory 102. And, the aggregate bandwidth may be smaller than that of the entire bandwidth presented to the entire switching device because the secondary memory is used only for oversubscribed traffic.

The controller 106 also controls dequeuing of packets buffered in the OCB primary memory 102. The controller 106 may notify that the switching system 100 has backlogged data and request credits from the packets' VOQs destination ports. The controller 106 may also receive a credit grant from a destination port to a VOQ on the credit line 112. The controller 106 can control the OCB primary memory 102 and the off-chip secondary memory 104 to dequeue packets buffered therein. The dequeued packets may be transmitted to a local port within the same device, a peer device, output interface, or to a remote device accessible by a switch fabric.

The hierarchical structure in the example of the primary memory 102 being an on-chip SRAM and the secondary memory 104 being an off-chip DRAM not only addresses storage capacity problems that can exist in, for example, a primary memory-only switching device, but also can minimize enqueuing and dequeuing latencies. Specifically, when resources of the primary memory 102 are oversubscribed, packets in the OCB primary memory 102 are dynamically migrated to the secondary memory 104, thereby efficiently buffering all the packets. When the congestion in the OCB primary memory 102 subsides, the secondary memory 104 can be dynamically emptied and the switching system 100 can rely on only the OCB primary memory 102 for storage until congestion again occurs. During this period, because only the OCB primary memory 102 is utilized, the switching system 100 may enqueue and dequeue packets with low latencies.

Figure 2:
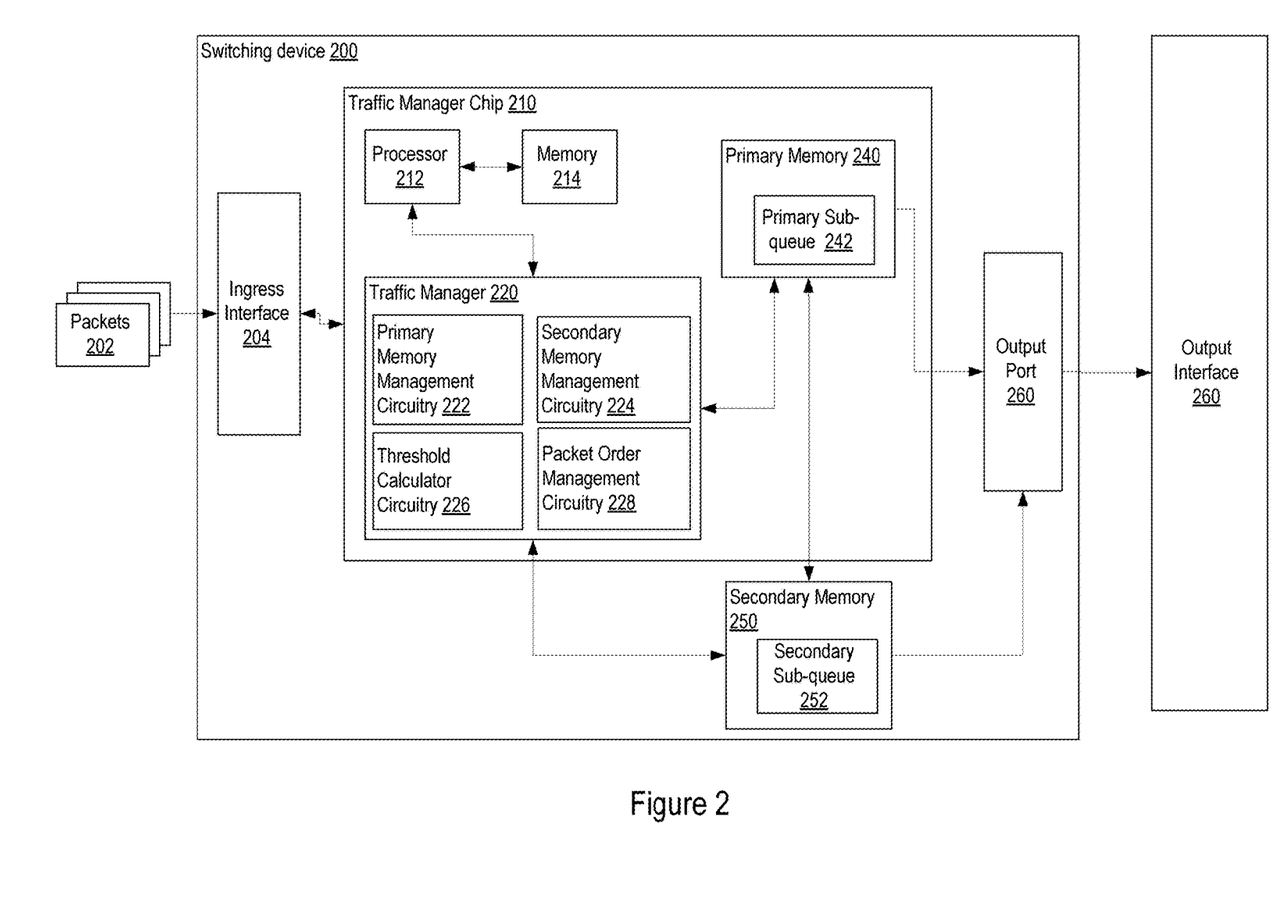
FIG. 2 is a block diagram of an example switching device.

FIG. 2 is a block diagram of an example switching device. The example switching device 200 is presented as just one of many possible network device architectures that may include packet congestion control functionality, and the example provided in FIG. 2 is one of many different possible alternatives. For example, a switching system can include 1) a single switching device chip/FPGA (field-programmable gate array), 2) several switching device chips/FPGAs connected in a mesh or back to back topology, or 3) multiple switching devices interconnected by a switching fabric.

The techniques described below are not limited to any particular network device architecture. Instead, the packet congestion control techniques described below are applicable to any network device that incorporates the traffic manager described. The network devices may be switches, routers, bridges, blades, hubs, or any other device to handle routing packets from sources to destinations through a network. The network devices are part of one or more networks that connect, for example, application servers together across one or more networks. The network devices may, for example, be present in one or more data centers that are responsible for routing packets from a source to a destination.

The switching device 200 includes an ingress interface 204, a traffic manager chip 210, secondary memory 250, and an output port 206. The secondary memory 250 may be an off-chip memory, such as an off chip DRAM, located outside the traffic manager chip 210. The secondary memory 250 may be located external to the switching device 200. The switching device 200 receives packets 202 through the ingress interface 204. The packets may then flow to the traffic manager chip 210 which may process the packets and buffer them in the primary memory 240 or in the secondary memory 250.

The traffic manager chip 210 includes a processor 212, a memory 214, a traffic manager 220, and primary memory 240. The primary memory 240 may be on-chip buffer memory, such as an on-chip SRAM, located on the traffic manager chip 210. A primary sub-queue 242 may be maintained for the packets buffered in the primary memory 240, and a secondary sub-queue 252 may be maintained for the packets buffered in the secondary memory 250. Although FIG. 2 illustrates the primary sub-queue 242 and the secondary sub-queue 252 separately, both are a part of a single VOQ. The primary sub-queue 242 may be headed by the secondary sub-queue 252 on the VOQ. In embodiments, the single VOQ may be a pair of a primary memory linked list and a secondary memory linked list. The primary memory linked list may be a linked list of packets buffered in the primary memory. The secondary memory linked list may be a linked list of packets or packet aggregates buffered in the secondary memory.

The traffic manager 220 may include primary memory management circuitry 222, secondary memory management circuitry 224, threshold calculator circuitry 226, and packet order managing circuitry 228.

The traffic manager 220 may buffer received packets in the primary memory 240. The primary memory 240 may be partitioned to multiple buffers of relatively small size (e.g. 128 Byte to 512 Byte), and thus, a single packet may occupy more than one buffer of the primary memory 240. Packets may be queued to the primary sub-queue 242 as a linked list of primary memory buffers.

The primary memory management circuitry 222 monitors an amount of primary memory resources consumed in association with the operation of the primary sub-queue 242, and an amount of available primary memory resources. Primary memory resources may include primary memory buffers and primary memory packet descriptors.

The primary memory management circuitry 222 determines whether the primary sub-queue 242 in the primary memory 240 is congested or not. In embodiments, the primary memory management circuitry 222 may determine whether the level of consumed primary memory resources exceeds the primary-to-secondary memory threshold calculated in real-time by the threshold calculator circuitry 226. The level of consumed primary memory resources may be calculated in terms of bytes, packets, and/or packet descriptors. The primary-to-secondary memory threshold may be varied based on the type of data and the size of primary sub-queue. Regarding the type of data, for example, video data tends to be burstier than voice over internet protocol (VOIP). Regarding the size of data flow, a large flow tends to occupy more primary memory resources even in normal uncongested operation, and thereby triggers the migration of packets into the secondary memory at a larger primary-to-secondary memory threshold. If the level of consumed primary memory resources exceeds the primary-to-secondary memory threshold, the primary memory management circuitry 222 packs and migrates packets previously buffered in the primary sub-queue 242 to the secondary sub-queue 252.

The primary memory management circuitry 222 instructs the primary sub-queue 242 to dequeue packets buffered in the primary sub-queue 242. Similarly, the secondary memory management circuitry 224 instructs the secondary sub-queue 252 to dequeue packets buffered in the secondary sub-queue 252. In embodiments, traffic manager 220 sends a credit request to the processor 212, or a processor of a remote device across a switch fabric, and receives a credit grant from the processor 212 or the processor of the remote device. Upon receipt of the credit grant, the traffic manager 220 issues a dequeue request to the primary memory management circuitry 222 or the secondary memory management circuitry 224 to dequeue the packets from the VOQ, either from the primary sub-queue 242 to the output port 260, or from the secondary sub-queue 252 to the output port 260.

The threshold calculator circuitry 226 can calculate a primary-to-secondary memory threshold, such as a SRAM-to-DRAM threshold, based on a number of the available primary memory resources and a type of the primary sub-queue. The primary-to-secondary memory threshold is a threshold size of VOQ that triggers migration of packets from the primary memory 240 to the secondary memory 250. The calculated primary-to-secondary memory threshold value is stored in the memory 214. The primary-to-secondary memory threshold may be a dynamic value calculated based on available primary memory resources and the type of VOQ. An example of dynamically calculating the primary-to-secondary memory threshold is described below with reference to FIG. 5. The VOQ and queueing resources may be implemented in terms of bytes, buffers, buffers descriptors, or any other structure.

The packet order managing circuitry 228 prevents any reversal of packet order while the secondary memory 250 is in a recovery state. As discussed later, in general the recovery state refers to a state where a memory is emptied and receives no additional packets. In embodiments, the packet order managing circuitry 228 determines whether a dequeue command for dequeuing the last packet in the secondary sub-queue 252 is issued. If the dequeue command is issued, the packet order managing circuitry 228 prevents the primary sub-queue 242 from dequeuing packets to the output port 260 until the last packet in the secondary sub-queue 252 is actually dequeued. In other embodiments, the packet order managing circuitry 228 determines whether a dequeue command for dequeuing all the packets in the secondary sub-queue 252 is issued. If the dequeue command is issued, the packet order managing circuitry 228 prevents the primary sub-queue 242 from dequeuing packets to the output port 260 until all the packets in the secondary sub-queue 252 are actually dequeued.

Figure 3:
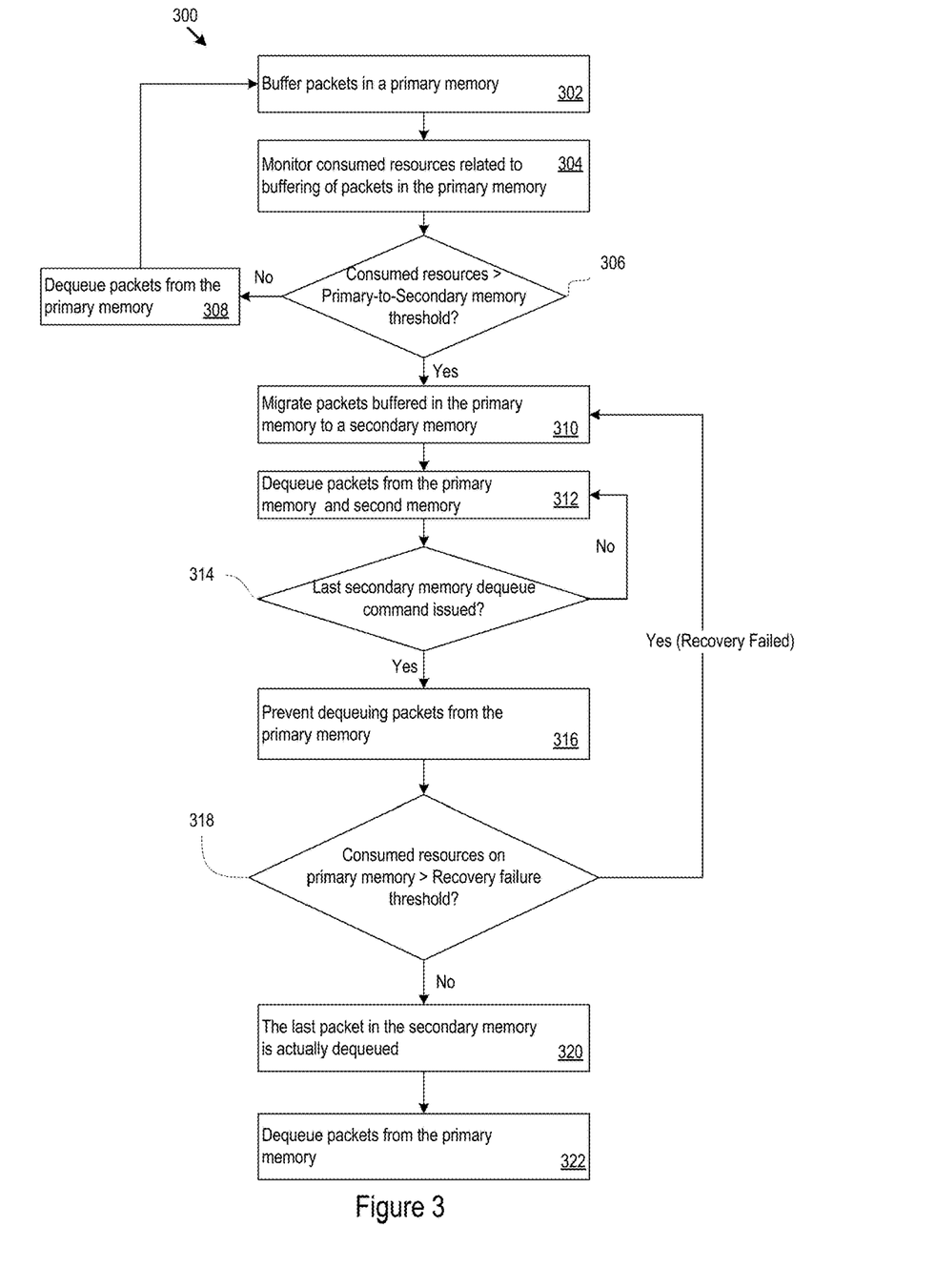
FIG. 3 is a process flow diagram illustrating an example of queuing and dequeuing packets in a switching device.

FIG. 3 is a process flow diagram illustrating example enqueuing and dequeuing packets in a switching device. The switching device 200 may receive packets and buffers them in a primary memory (302).

The traffic manager 220 in the switching device 200 monitors resources consumption related to buffering of packets in the primary memory 240 (304). For example, the traffic manager 220 may monitor an amount of primary memory resources consumed by the primary sub-queue 242 and an amount of total available primary memory resources.

The traffic manager 220 determines whether the level of consumed resources exceeds a primary-to-secondary memory threshold (306). The primary-to-secondary memory threshold may be a dynamic value calculated based on the number of available memory resources and a type of the primary sub-queue. An example of determining primary-to-secondary memory threshold is described below with reference to FIG. 5.

If it is determined that the level of consumed resources exceeds the primary-to-secondary memory threshold, packets buffered in the primary memory 240 can be migrated to the secondary memory 250 (310). In an example operation, the traffic manager 220 instructs the primary memory 240 to evacuate packets buffered therein to the secondary memory 250. The primary memory 240 may evacuate all the packets buffered therein to the secondary memory 250. In other examples, the primary memory 240 may evacuate some of the packets buffered therein to the secondary memory 250 to lower the level of consumed resources to a certain level. When packets buffered in the primary memory 240 are migrated into the secondary memory 250, the packets are packed into a bundle comprising multiple secondary memory buffers, for example three secondary memory buffers. Packing the packets lowers the amount of space the packets consume when stored in the secondary memory 250.

If it is determined that the level of consumed resources does not exceed a primary-to-secondary memory threshold, no packets buffered in the primary memory 240 are migrated to the secondary memory 250, and the traffic manager 220 selectively dequeues packets buffered in the primary memory 240 to the output port 260, such as upon receipt of a credit grant from the processor 212 (308). Packet segments are dequeued in a sequence from the primary memory 240 and/or the secondary memory 250. The dequeued primary memory buffers are returned as free primary memory buffers.

Once the packets buffered in the primary memory are migrated to the secondary memory 250, the traffic manager 220 selectively dequeues the migrated packets in the secondary memory 250 to output port 260 as well as packets in the primary memory 240, such as upon receipt of a credit grant from the processor 212 (312). When dequeuing the migrated packets in the secondary memory 250, a secondary memory bundle that may include more than one packet is dequeued. Then it is parsed and unpacked to its constituent packets, and the constituent packets are dequeued accordingly. The dequeued secondary memory bundle buffers may be used again as free secondary memory buffers.

The traffic manager 220 then determines whether a command for dequeuing the last packet buffered in the secondary memory 250 is issued (314). If the command for dequeuing the last packet is issued, then the traffic manager prevents dequeuing packets from the primary memory 240 (316). Also, when the command for dequeuing the last packet is issued, the secondary memory 250 enters recovery state where no packets in the primary memory 240 migrate to the secondary memory 250. The prevention of dequeuing packets in the primary memory 240 continues until the last packet in the secondary memory 250 is actually dequeued.

If the command for dequeuing the last packet is not issued yet, the traffic manager 220 continues to dequeue packets from the secondary memory 250 until the command for dequeuing the last packet buffered in the secondary memory 250 is issued (312).

While preventing dequeuing of packets from the primary memory 240, the traffic manager 220 determines whether the level of consumed resources on the primary memory 240 exceeds a recovery failure threshold (318). The recovery failure threshold may be higher than the primary-to-secondary memory threshold. If the level of consumed resources on the primary memory 240 exceeds the recovery failure threshold, the recovery of the secondary memory 250 fails, and the traffic manager 220 resumes migrating packets buffered in the primary memory 240 to the secondary memory 250 (310). If the level of consumed resources related to the primary memory 240 does not exceed the recovery failure threshold, the recovery of the secondary memory 250 continues and the last packet in the secondary memory 250 is finally dequeued (320).

After the last packet in the secondary memory 250 is finally dequeued, the traffic manager 220 resumes dequeuing packets from the primary memory 240 (322). Because packets in the primary memory 240 are not dequeued until the last packet in the secondary memory 250 is actually dequeued, a possibility of packet order reversal can be prevented.

Figure 4:
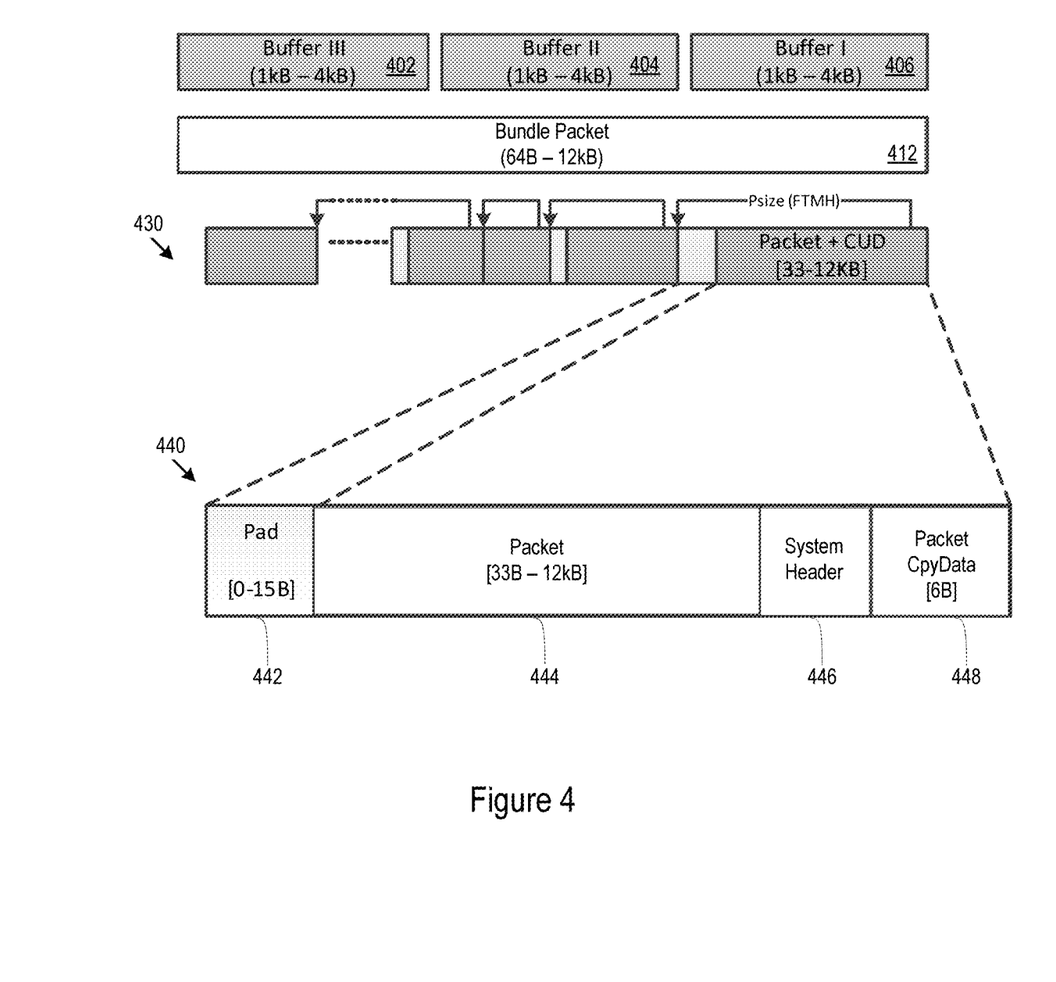
FIG. 4 is a schematic diagram example of packed packets in DRAM.

FIG. 4 shows a schematic diagram example of packed packets in DRAM. In embodiments, when packets in the primary memory 240 are migrated to the secondary memory 250, the packets are packed into a bundle packet 412. The bundle packet 412 may include multiple buffers, such multiple DRAM buffers. For example, the bundle packet 412 may include three DRAM buffers 402, 404, and 406. Each of the DRAM buffers may have a storage capacity, for example, between 1K Bytes to 4 K Bytes. The bundle packet 412 may have a storage capacity up to 12 K Bytes. A diagram 430 illustrates a linked list of bundle packets. Each bundle packet is prefixed by a system header 446 and a packet copy data 448. Also, each bundle packet is padded up to 16 Byte alignment. The packet copy data 448 includes attributes specific to the packet-copy, such as Source-Port, Traffic-Class, Drop-Precedence, Snoop/Mirror-Command, and other packet related attributes. The system header 446 contains additional packet headers required for their processing within the switching device. The order of packets in the bundle packet 412 may be the same as their order in the secondary sub-queue 252.

The packing of packets into the bundles provides dense packing and good utilization of memory. Also, it provides optimized utilization of DRAM device sinceDRAM has better utilization when writing or reading large chunks of data as opposed to processing a single packet.

Figure 5:
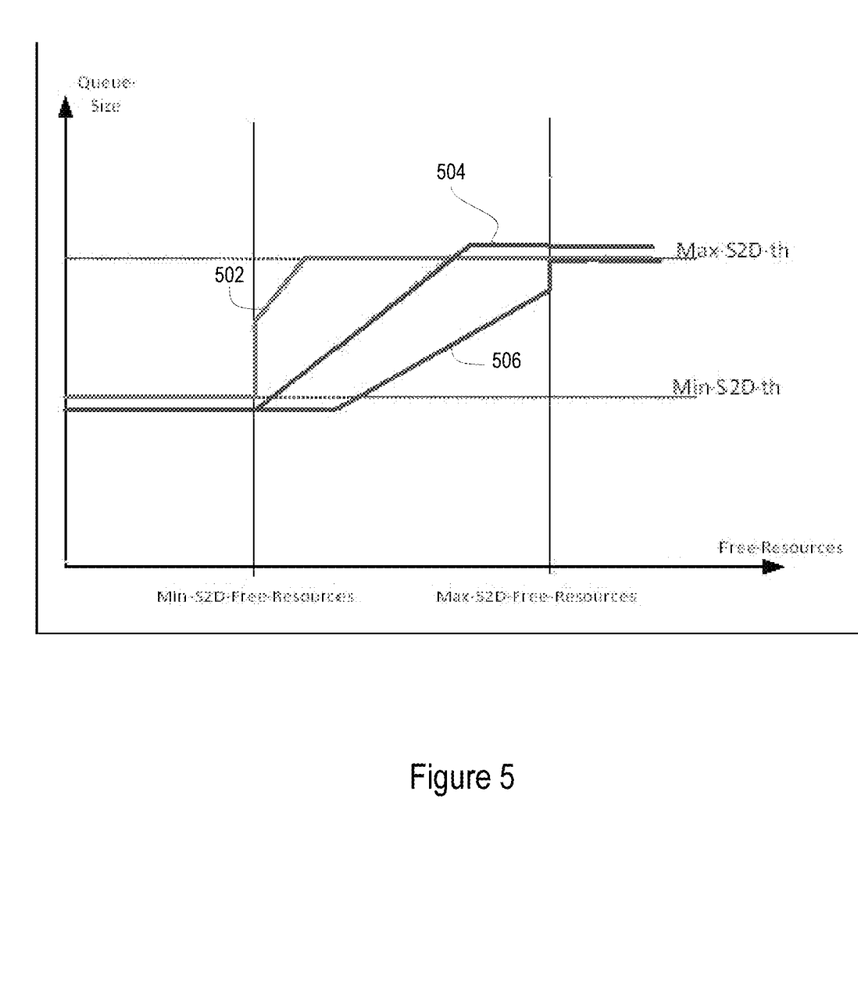
FIG. 5 is a diagram showing an example of dynamic SRAM-to-DRAM thresholds.

FIG. 5 is a diagram showing an example of dynamic primary-to-secondary memory thresholds. Three different dynamic primary-to-secondary memory thresholds 502, 504 and 506 are illustrated on FIG. 5. The three different dynamic primary-to-secondary memory thresholds are functions. Each of them applies to different queue types in term of bandwidth and burstiness. The primary-to-secondary memory threshold, such as a SRAM-to-DRAM threshold, is a threshold on the size of the primary sub-queue 242 that is a function of the consumed resources in the primary memory 240, that triggers migration of packets from the primary memory 240 to the secondary memory 250.

At FIG. 5, the x-axis represents free primary memory resources, and the y-axis represents a size of the primary sub-queue. The example of FIG. 5, is described in terms of SRAM and DRAM, however, dynamic operation of other forms of two different memories can be similarly developed. In FIG. 5, the dynamic SRAM-to-DRAM thresholds increase as the free primary memory resources increase. The dynamic SRAM-to-DRAM threshold may be derived by right-shifting (i.e., dividing) the amount of free resources by an adjust-factor. The adjust factor may be a predetermined value, such as set by a user, or may be a dynamically changing value, that varies based on system parameters, such as processor usage, input/output activity, the number of packets being processed, network congestion, or any other parameters internal or external to the network device. In addition, the adjust factor may be traffic characteristics of the queue, with respect to rate, burstiness, and latency (e.g. video and audio as opposed to other data). The higher the adjust-factor is set, the lower the dynamic threshold will be, and the packets in SRAM will be evacuated to DRAM earlier. As shown in FIG. 5, among the three thresholds 502, 504 and 506, the adjust-factor for the dynamic SRAM-to-DRAM threshold 506 is the highest and the adjust-factor for the dynamic SRAM-to-DRAM threshold 502 is the lowest.

The dynamic SRAM-to-DRAM threshold may be set in a range between a minimum SRAM-to-DRAM threshold (Min-S2D-th) and a maximum SRAM-to-DRAM threshold (Max-S2D-th). Specifically, the portions of the original dynamic SRAM-to-DRAM threshold that exceed Max-S2D-th can be reduced to Max-S2D-th, and the portions of the original dynamic SRAM-to-DRAM threshold that are below Min-S2D-th can be increased to Min-S2D-th.

When free primary memory resources are between a Minimum SRAM-to-DRAM free resources (Min-S2D-Free-Resources) and a Maximum SRAM-to-DRAM free resources (Max-S2D-Free-Resources), the dynamic SRAM-to-DRAM threshold calculation is completed. If the free primary memory resources are above the Maximum SRAM-to-DRAM free resources, the dynamic SRAM-to-DRAM threshold is set to the Max-S2D-th. If the free primary memory resources are below the Minimum SRAM-to-DRAM free resources, the dynamic SRAM-to-DRAM, threshold is set to the Min-S2D-th.

In other examples, the SRAM-to-DRAM threshold may be dynamically determined by a function, such as a monotonic function of the number of free primary memory resources, which is bounded by a maximum value and a minimum value.

Figure 6:
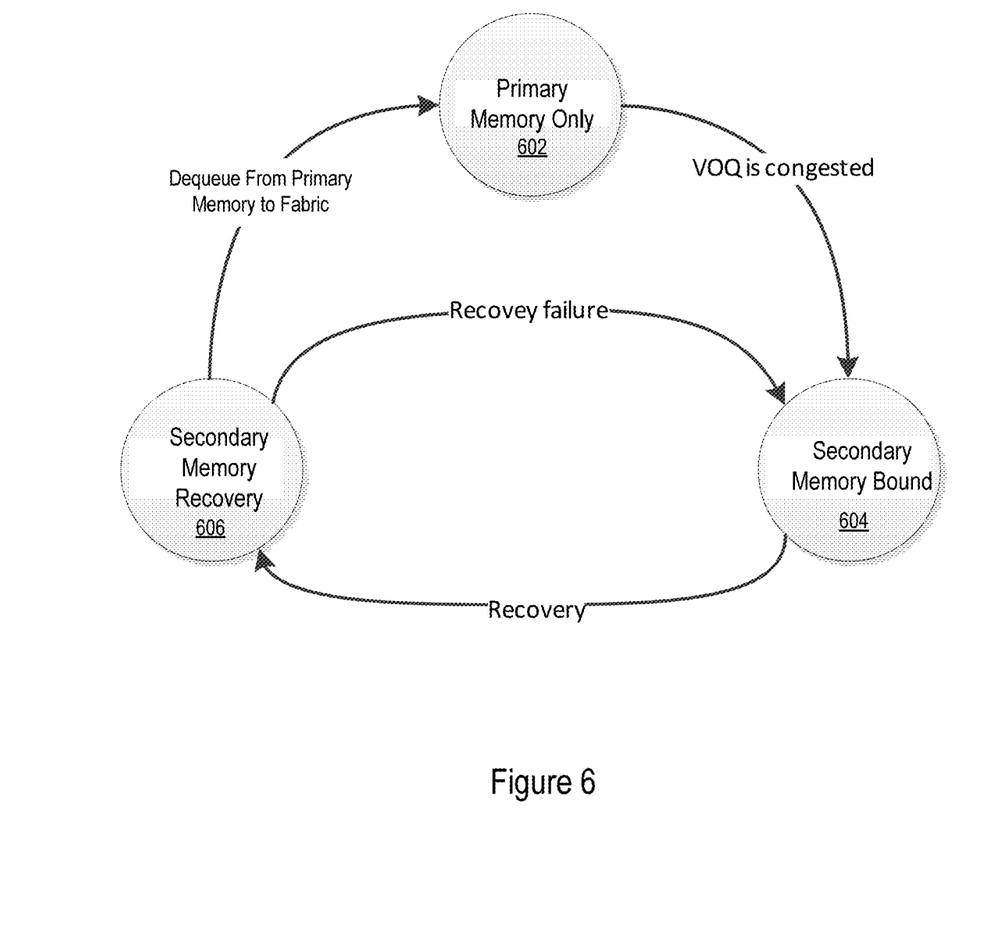
FIG. 6 is a schematic diagram example of virtual output queue (VOQ) states in association with primary memory and secondary memory.

FIG. 6 shows a schematic diagram of an example of VOQ states in association with a primary memory and a secondary memory. A VOQ is maintained only in the primary memory when congestion remains below a threshold in the primary memory 240 (602). For example, with reference to FIG. 2, the switching device 200 receives packets and buffers all the packets in the primary memory 240. As long as resources consumed with regard to the primary memory 240 are below the primary-to-secondary memory threshold, all the packets are buffered in the primary memory 240, and no migration or evacuation of packets to the secondary memory 250 occurs.

When the level of consumed resources in the primary memory 240 exceeds the primary-to-secondary memory threshold, the primary sub-queue 242 is determined to be congested, and the VOQ is bound to the secondary memory 250 (604). Once the VOQ becomes secondary memory bound, it starts a process of evacuating packets in the primary memory 240 to the secondary memory 250 to lower the consumed primary memory resources to a certain minimum level, but no lower, for example, Min-S2D-th as indicated in FIG. 5. The packets are not evacuated below the minimum level so that efficient packing of packets in the primary memory 240 to secondary memory bundles can be sustained. Packing of packets in the primary memory 240 to secondary memory bundles may be done as described in FIG. 4 prior to, or as part of the migration to the secondary memory.

A VOQ in secondary-memory-bound state becomes a pair of a primary sub-queue and a secondary sub-queue. The VOQ in secondary memory bound state has its head in the secondary memory 250 and its tail in the primary memory 240.

Once congestion in the VOQ subsides to below a level, no more packets in the primary memory 240 may be migrated or evacuated to the secondary memory 250, and the level of consumed resources in the secondary memory 250 decreases. When a command for dequeuing or emptying the last bundle in the secondary memory 250 is issued, the VOQ enters a secondary memory recovery state (606). For example, the VOQ enters a secondary memory recovery state when a command for dequeuing the last packet in the secondary memory 250 is issued. During the recovery, the VOQ tries to reside only in the primary memory 240, not to migrate packets to the secondary memory, and dequeues packets from its head in the primary memory 240 directly.

The secondary memory may have a relatively long latency from the time when a command for dequeuing the last remaining packet in the secondary memory 250 is issued to the time when the packet is actually dequeued. Thus, during this long latency, so called "in-transit" period of secondary memory recovery, no command for dequeuing packets in the primary memory should be issued in order to prevent packet order reversal. For example, during the in-transit period, the last packet remaining in the secondary memory 250 should be actually dequeued to an output port before any of the packets in the primary memory 240 is dequeued to an output port. After the last packet in the secondary memory 250 is actually dequeued, the VOQ in the primary memory 240 can start dequeuing packets buffered in the primary memory 240, and the VOQ stays only in the primary memory 240 until next congestion occurs (602).

During the in-transit period of the secondary memory recovery, no packets in the primary memory 240 are dequeued to an output port, and thus the consumed resources in the primary memory 240 may grow. If the level of consumed resources in the primary memory exceeds a primary-to-secondary memory threshold as discussed with reference to FIG. 5, but is still below the a recovery failure threshold, such as DRAM-Recovery-Failure-Threshold, then the VOQ maintains the secondary memory recovery state, and does not issue any command for dequeuing packets from the primary memory 240 to the secondary memory 250.

If, during the recovery, the level of consumed resources in the primary memory 240 exceeds the recovery failure threshold, then the secondary memory recovery fails. The VOQ becomes secondary-memory-bound again and starts migrating packets from the primary memory 240 to the secondary memory 250.

Figure 7:
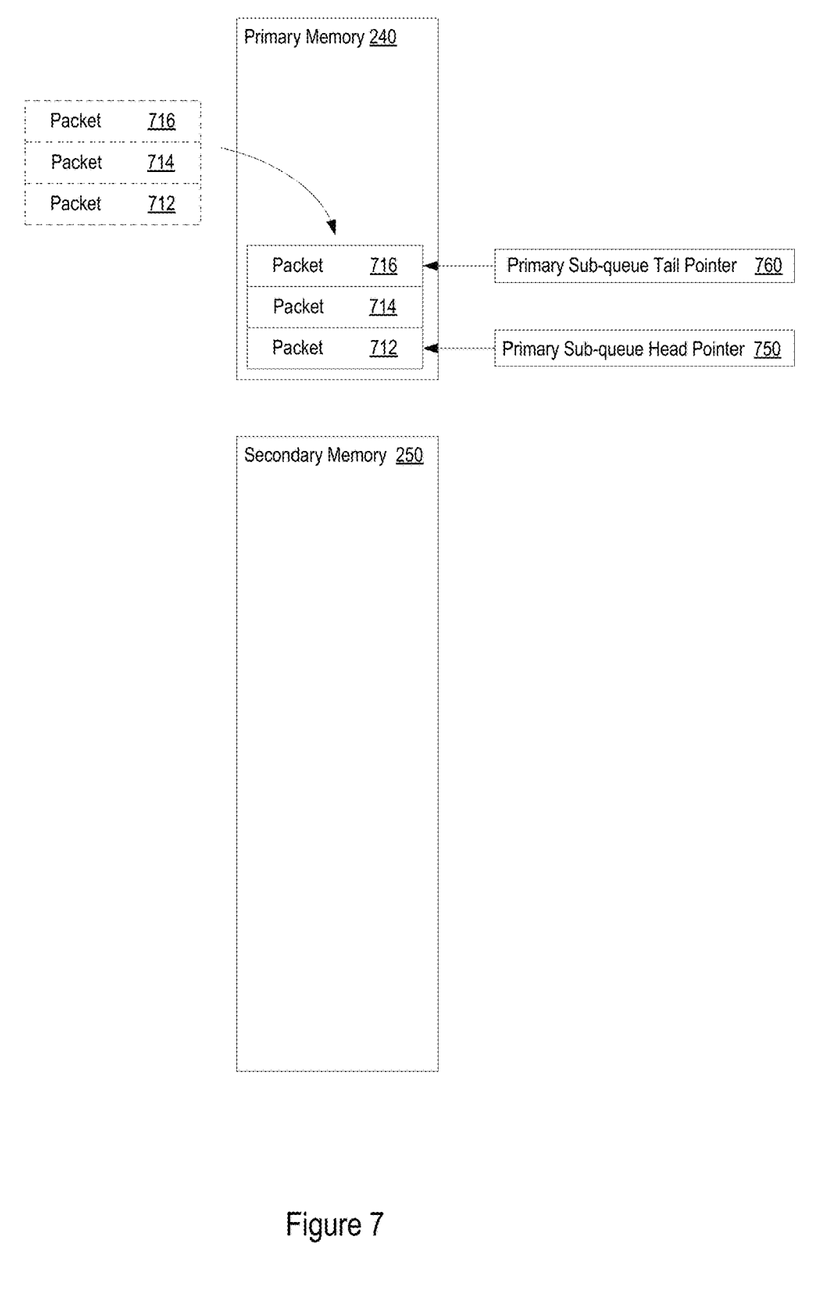
FIG. 7 shows an example of VOQ residing in primary memory.

FIG. 7 shows an example of VOQ residing in the primary memory. Packets 712, 714, 716 are buffered in the primary memory 240 on the packet managing chip 210. The packets 712, 714, 716 are received from, for example, a source server through the ingress interface 204. The packet 712 is received first and the packet 716 is received last among the three packets. As described above, the primary memory 240 is partitioned to multiple buffers of relatively small size. Thus, each of the packets 712, 714, 716 can occupy one or more buffers of the primary memory 240.

A VOQ consists of linked lists of packets buffered in the primary memory 240. A primary sub-queue head pointer 750 and a primary sub-queue tail pointer 760 may be associated with the VOQ, which point the starting queue and the ending queue of the VOQ, respectively. In examples, the primary sub-queue head pointer 750 may point to the packet 712 buffered in the primary memory 240. The primary sub-queue tail pointer 760 may point to the packet 716 buffered in the primary memory 240. In other examples, the primary sub-queue head pointer 750 may point to one of the primary memory buffers occupied by the packet 712, which may be the primary memory buffer in the primary memory 240. Similarly, the primary sub-queue tail pointer 760 may point to one of the primary memory buffers occupied by the packet 716.

When congestion in the primary memory 240 remains below the threshold, no packets are migrated or evacuated to the secondary memory 250. Thus, VOQ does not reside in the secondary memory 250 and no packets are buffered in the secondary memory 250. The VOQ may dequeue packets 712, 714, 716 to the output port 260 with relatively short latency because it does not utilize the secondary memory 250, which has relatively longer latency in enqueuing and dequeuing packets.

Figure 8:
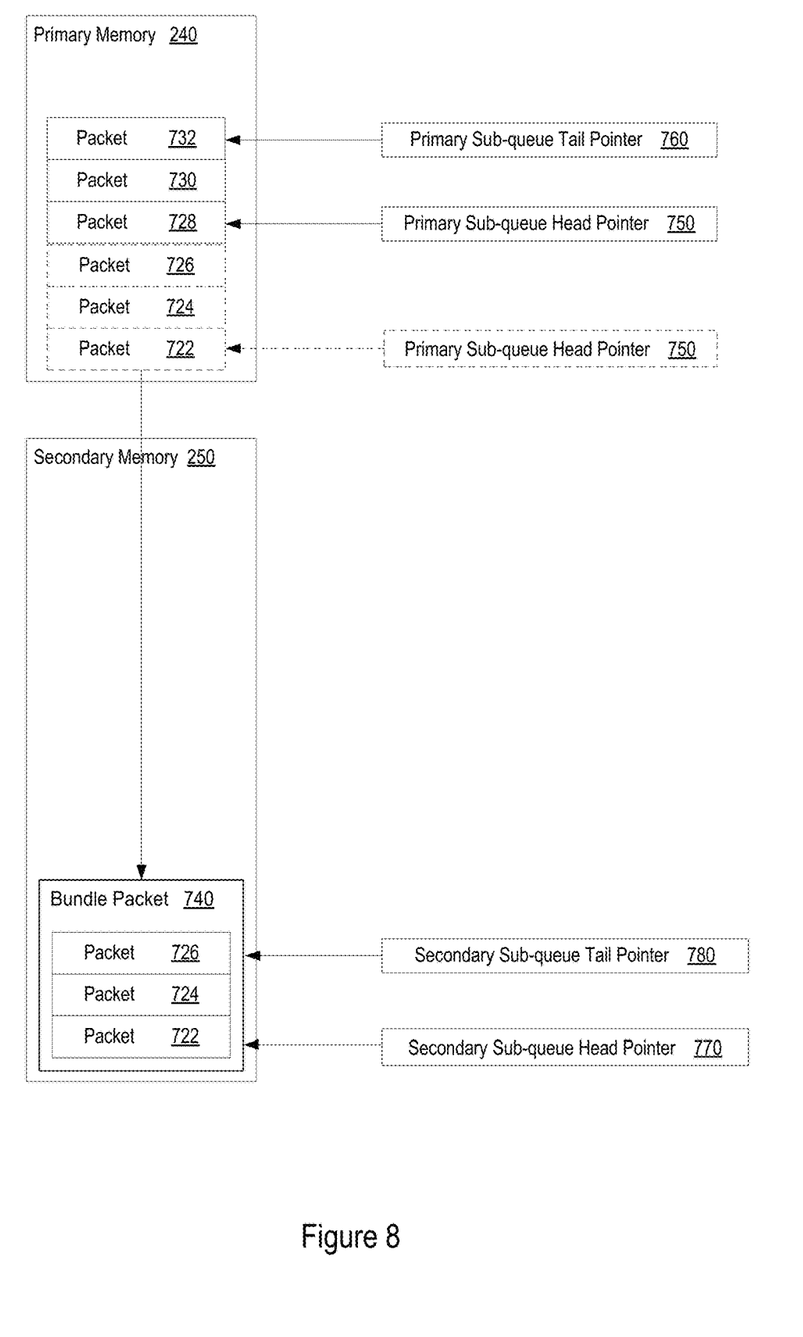
FIG. 8 shows an example of VOQ residing in both primary memory and secondary memory.

FIG. 8 shows an example of VOQ residing in both a primary memory and a secondary memory. As the number of incoming packets received by the switching device 200 increases, more packets are buffered in the primary memory 240. In this example, packets 722, 724, 726, 728, 730, 732 are first buffered in the primary memory 240, and the level of consumed resources in the primary memory exceeds a primary-to-secondary memory threshold, for example, the SRAM-to-DRAM threshold illustrated in FIG. 5. Then, the VOQ is bound to the secondary memory 250, and packets 722, 724, 726 in the primary memory 240 are migrated to the secondary memory 250. Before the VOQ is bound to the secondary memory 250, the primary sub-queue head pointer 750 pointed the packet 722 in the primary memory 240. After the VOQ is bound to the secondary memory 250, a secondary sub-queue head pointer 770 points the packet 722 buffered in the secondary memory 250. As discussed with reference to FIG. 4, multiple packets are packed into a bundle packet 740 for buffering in the secondary memory 250. This will increase secondary memory 250 utilization in both bandwidth and capacity. In examples, the secondary sub-queue head pointer 770 may point the bundle packet 740 of the secondary memory 250 where the packet 722 is present.

After the packets 722, 724, 726 are evacuated to the secondary memory 250, the primary sub-queue head pointer 750 points to the packet 728 that remains in the primary memory 240. The primary sub-queue tail pointer 760 continues pointing the last packet, for example the packet 732, buffered in the primary memory 240 so that a part of the VOQ still resides in the primary memory 240. Thus, the head part of the VOQ may be maintained in the secondary memory 250 and the tail part of the VOQ may be maintained in the primary memory 240. The secondary sub-queue 252 dequeues packets buffered in the secondary memory 250 and the primary sub-queue 242 dequeues packets buffered in the primary memory 240.

The VOQ may have additional pointers such as a secondary sub-queue tail pointer 780. The secondary sub-queue tail pointer 780 points to the last packet, for example, the packet 726, buffered in the secondary memory such that the VOQ may identify the linked-list of the secondary sub-queue.

Figure 9:
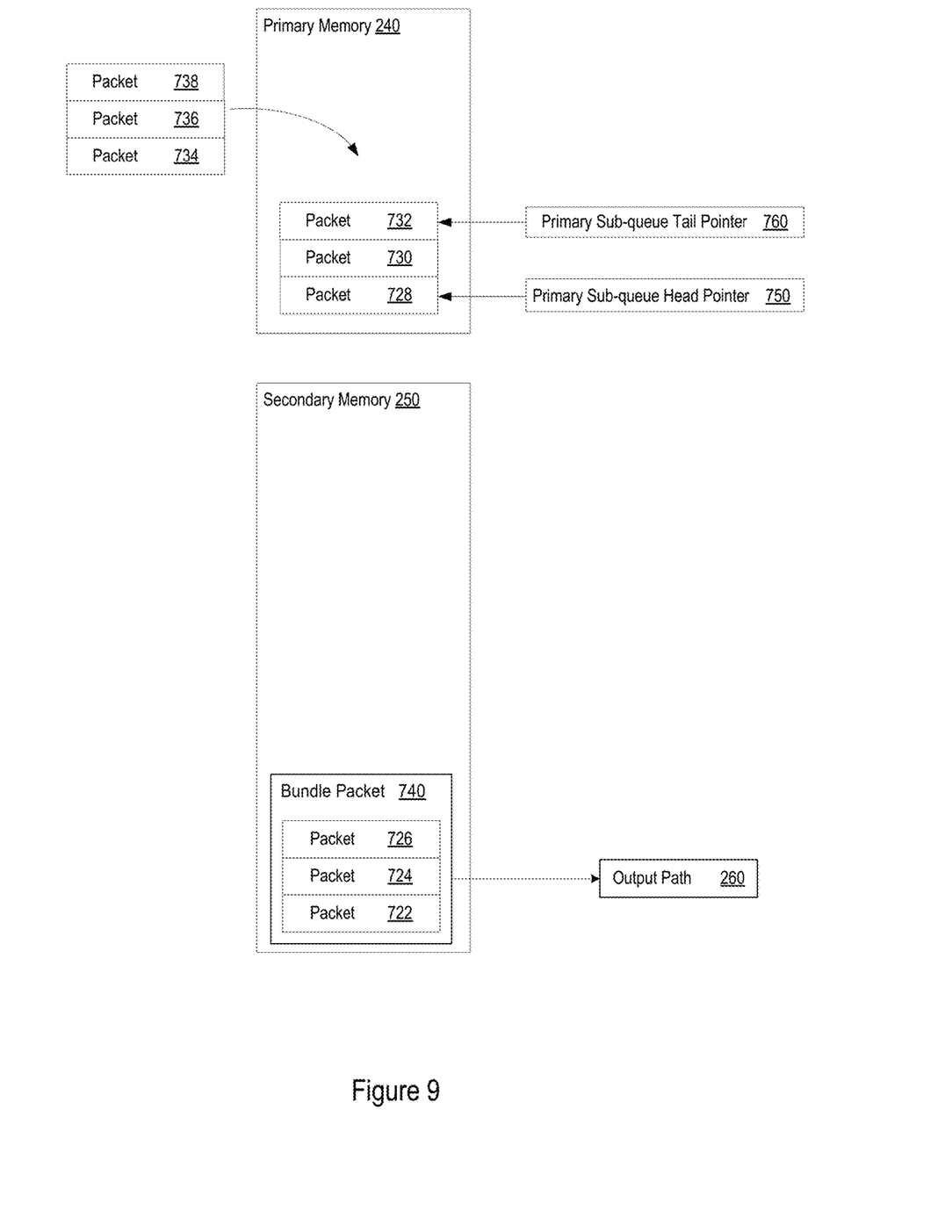
FIG. 9 shows an example of VOQ during secondary memory recovery stage.

FIG. 9 shows an example of VOQ during secondary memory recovery. Once congestion in the primary memory 240 reduces to below a threshold, no more packets in the primary memory 240 are migrated or evacuated to the secondary memory 250, and the level of consumed resources in the secondary memory 250 decreases. For example, the packets 728, 730, 732 in the primary memory 240 are not migrated to the secondary memory 250, and the consumed resources in the secondary memory 250 decrease as the packets such as the packets 722, 724, 726 are dequeued to the output port 260.

In this example, when a command for dequeuing the packets 722, 724, 726 in the secondary memory 250 is issued, the VOQ enters a secondary memory recovery state. During the recovery, the primary sub-queue head pointer 750 points to the first packet, for example, the packet 728. Then, the VOQ dequeues the packets 728, 730, 732 accordingly.

Because the secondary memory may sustain a long latency in dequeuing as described above, packets in the primary memory 240 may be dequeued before the packets in the secondary memory 250. For example, the packet 728 may be dequeued before the packets 722, 724, 726 are dequeued. This may cause packet order reversal because the switching device 200 needs to output packets in the same order as it received. Thus, in an example, VOQ in the primary memory 240 may not dequeue packets in the primary memory 240 until the packets in the secondary memory 250 are actually dequeued. In other examples, other mechanisms can be used to maintain the dequeue order between the primary and the secondary memories.

During the in-transit period of the secondary memory recovery as described with reference to FIG. 6, no packets in the primary memory 240 are dequeued to the output port 260, and thus the consumed resources in the primary memory 240, or the primary sub-queue 242 may grow. For example, new packets, such as packets 734, 736, 738 can be buffered into the primary memory 240.

If the level of consumed resources in the primary memory 240 exceeds the primary-to-secondary memory threshold but is still below the recovery failure threshold, then the VOQ retains the secondary memory recovery state, and does not issue any command for migrating packets from the primary memory 240 to the secondary memory 250. For example, if the level of resources consumed by the packets 728, 730, 732, 734, 736, 738 in the primary memory 240 exceeds the primary-to-secondary memory threshold but is still below the recovery failure threshold, none of the packets buffered in the primary memory 240 may be migrated to the secondary memory 250.

If the level of consumed resources in the primary memory 240 exceeds the recovery failure threshold, then the secondary memory recovery fails. The VOQ becomes secondary memory bound again and starts migrating packets from the primary memory 240 to the secondary memory 250. For example, if the level of resources consumed by the packets 728, 730, 732, 734, 736, 738 in the primary memory 240 exceeds the recovery failure threshold, the VOQ becomes secondary memory bound and some of the packets in the primary memory 240, for example, packets 728, 730, 732 may be migrated to the secondary memory 250. Then, the secondary sub-queue head pointer 770 may point to the packet 728 now buffered in the secondary memory 250.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
   a primary memory configured to buffer packets for temporary storage, the primary memory buffering the packets in a plurality of buffers, each buffer being smaller than a size of a packet, each packet being buffered in a plurality of buffers according to a first link list; and
   traffic manager circuitry configured to
      monitor consumed resources in the device related to the buffering of packets in the primary memory,
      migrate packets buffered in the primary memory to a secondary memory for temporary storage in response to the consumed resources in the device exceeding a threshold amount, and
      control dequeuing of the packets from the primary memory in response to the consumed resources in the device not exceeding the threshold amount, and
      control dequeuing from both the primary memory and the secondary memory in response to the consumed resources in the device exceeding the threshold amount,
wherein the primary memory is static random access memory (SRAM), and the secondary memory is dynamic random access memory (DRAM).

2. The device of claim 1, wherein the threshold amount is a dynamic threshold amount.

3. The device of claim 2, wherein the traffic manager circuitry is configured to determine the dynamic threshold amount based on a number of available primary memory resources associated with the primary memory, and a type of a virtual output queue (VOQ).

4. The device of claim 1, wherein the secondary memory includes a larger storage capacity than the primary memory.

5. The device of claim 1, wherein packets buffered in the primary memory are packed by the traffic manager circuitry to form a packed group of packets and migrated to the secondary memory for storage as the packed group of packets.

6. The device of claim 1, wherein the traffic manager circuitry is configured to, during a certain period of dequeuing packets from the secondary memory, prevent packets buffered in the primary memory from being dequeued.

7. The device of claim 1, wherein the traffic manager circuitry is configured to, during a certain period of dequeuing packets from the secondary memory, prevent migration of packets from the primary memory to the secondary memory in response to the consumed resources being below a second threshold amount.

8. The device of claim 1, wherein the traffic manager circuitry is configured to, during a certain period of dequeuing packets from the secondary memory, migrate packets buffered in the primary memory to the secondary memory in response to the consumed resources being above a second threshold amount.

9. The device of claim 1, wherein the primary memory is included on a chip with the traffic manager circuitry and the secondary memory is off the chip.

10. The device of claim 1, wherein the primary memory is implemented as a first list of arrays, and the secondary memory is implemented as a second list of arrays.

11. A method comprising:
monitoring with traffic manager circuitry consumed resources related to buffering of packets in a primary memory, the primary memory buffering the packets in a plurality of buffers, each buffer being smaller than a size of a packet, each packet being buffered in a plurality of buffers according to a first link list;
responsive to the consumed resources exceeding a first threshold amount, the traffic manager circuitry evacuating packets buffered in the primary memory to a secondary memory; and
in response to receipt of a dequeue command, dequeuing packets from the primary memory in a case that the consumed resources in the device not exceeding the threshold amount, and dequeuing packets from both the primary memory and the secondary memory in a case that the consumed resources in the device exceeding the threshold amount,
wherein the primary memory is static random access memory (SRAM), and the secondary memory is dynamic random access memory (DRAM).

12. The method of claim 11, further comprising:
determining whether a command for dequeing a last packet in the secondary memory is issued; and
responsive to the command for dequeuing the last packet being issued, preventing packets buffered in the primary memory from being dequeued for an in-transit period.

13. The method of claim 12, further comprising:
during the in-transit period, determining whether the consumed resources on the primary memory exceed a second threshold amount; and
responsive to the consumed resources exceeding the second threshold amount, resuming evacuating packets buffered in the primary memory to the secondary memory.

14. The method of claim 12, further comprising: dequeuing packets from the primary memory after the in-transit period ends.

15. The method of claim 14, wherein the in-transit period ends when the last packet in the secondary memory is actually dequeued.

16. The method of claim 11, wherein migrating packets buffered in the primary memory to the secondary memory comprises packing packets buffered in the primary memory and evacuating the packed packets for storage as the packed packets in the secondary memory.

17. The method of claim 11, wherein evacuating packets buffered in the primary memory to the secondary memory comprises moving packets from the first linked list associated with the primary memory to a second linked list associated with the secondary memory.

18. A device comprising:
a primary memory;
a secondary memory; and
traffic manager circuitry configured to
queue incoming packets always in the primary memory upon receipt of the incoming packets, the primary memory buffering the packets in a plurality of buffers, each buffer being smaller than a size of a packet, each packet being buffered in a plurality of buffers according to a first link list,
relocate packets queued in the primary memory to the secondary memory in response to consumed resources in the device related to the queuing of incoming packets in the primary memory exceeding a threshold amount, and
control dequeuing of the packets from the primary memory in response to the consumed resources in the device not exceeding the threshold amount, and control dequeuing from both the primary memory and the secondary memory in response to the consumed resources in the device exceeding the threshold amount,
wherein the primary memory is static random access memory (SRAM), and the secondary memory is dynamic random access memory (DRAM).

19. The device of claim 18, wherein the traffic manager circuitry is further configured to, during an in-transit recovery period of the secondary memory, prevent packets buffered in the primary memory from being dequeued.

* * * * *